US007000041B2

(12) United States Patent
Creta et al.

(10) Patent No.: US 7,000,041 B2
(45) Date of Patent: Feb. 14, 2006

(54) METHOD AND AN APPARATUS TO EFFICIENTLY HANDLE READ COMPLETIONS THAT SATISFY A READ REQUEST

(75) Inventors: Kenneth C. Creta, Gig Harbor, WA (US); Sridhar Muthrasanalluar, Tumwater, WA (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 10/404,982

(22) Filed: Mar. 31, 2003

(65) Prior Publication Data

US 2004/0205270 A1 Oct. 14, 2004

(51) Int. Cl.
*G06F 13/00* (2006.01)
*G06F 12/08* (2006.01)
(52) U.S. Cl. .................. 710/100; 710/52; 711/118; 711/154; 370/295.7
(58) Field of Classification Search ............... 710/100, 710/52, 313; 370/412, 463, 395.7; 711/118, 711/154; 365/189.01, 189.05
See application file for complete search history.

(56) References Cited

U.S. PATENT DOCUMENTS 4,011,545 A * 3/1977 Nadir ..................... 709/200
4,447,673 A * 5/1984 Elliott et al. ............. 379/253
4,555,506 A * 11/1985 Karanewsky et al. ...... 514/91
6,208,644 B1 * 3/2001 Pannell et al. ............ 370/389
6,405,276 B1 * 6/2002 Chen et al. ............... 710/310
6,874,042 B1 * 3/2005 Sauber ...................... 710/38
2002/0184428 A1 12/2002 Bennett et al.

OTHER PUBLICATIONS

"CPU" cache prefetching:Timing evaluation of hardware implementations by Tsee, J. and Smith, A.J. (abstract only) Publication Date: May 1998.*
Search Report, PCT/US2004/004214, Nov. 2, 2004.
Written Opinion of the International Searching Authority, International Applicaiton No. PCT/US2004/004214, international filing date 11 Feb. 2004, date of mailing 13, Oct. 2005.

* cited by examiner

*Primary Examiner*—Gopal C. Ray
(74) *Attorney, Agent, or Firm*—Blakely, Sokoloff, Taylor & Zafman LLP

(57) ABSTRACT

A method and an apparatus to combine and to send data dynamically are presented. The method comprises receiving data that partially satisfies a read request from a memory in response to a request, wherein the request is from a requester. The method further comprises forwarding the data to the requester if a port used to forward the data of the read request is idle. If the port is busy, the data is stored for combining with additional data that partially satisfies the read request as the additional data is received, and the combined data is forwarded to the requester when the port is not busy. In one embodiment, the port is a PCI Express™ port.

9 Claims, 3 Drawing Sheets

METHOD AND AN APPARATUS TO EFFICIENTLY HANDLE READ COMPLETIONS THAT SATISFY A READ REQUEST

FIELD OF INVENTION

The present invention relates to computer technologies, and more particularly, to data transfer at an interface of a component within a computer system.

BACKGROUND

A computer system typically includes a processor, a chipset, a main memory, and a number of peripheral components. The processor further includes a cache memory. Although data is generally stored in the main memory, a copy of the data currently needed is usually stored in the cache memory to allow fast access of the data. A single data entry stored in the cache memory is commonly referred as a cacheline. The size of a cacheline varies among different computer systems.

Data may be transferred between the processor, the main memory, and the peripheral components within a computer system via components of the chipset. Typically, data is transferred between the main memory and other components within the computer system via a memory controller hub of the chipset. Large inbound read transactions targeting the main memory, a request for data is usually broken up into smaller reads by the memory controller hub. Each read retrieves a cacheline of data from the main memory, which is typically referred to as a read completion. For example, a 64-Byte cacheline system completes a request for 512 Bytes of data in eight read completions, where each read completion includes a cacheline of data, i.e. 64 Bytes. A request is completed in cacheline quantities because processors and memory controllers typically operate on cacheline quantities.

Due to the innovations in computer technologies, such as high-speed microprocessors running at 10 GHz, the existing parallel input/output interconnect, Peripheral Component Interconnect ("PCI") developed over ten years ago can no longer meet the demands for high speed and bandwidth. To cope with the demands for high speed and bandwidth, serial input/output interconnect has been developed. The latest serial input/output interconnect is PCI Express™ ("PCI Express" is a trademark of the PCI-Special Interest Group), which is the third generation of input/output interconnect. PCI Express™ is a high-speed serial interconnect, capable of sending multiple read completions for one read request. On PCI Express™, a large request to retrieve data from the memory could be completed in several transactions. Each transaction returns data that partially satisfies the request. The data returned may contain a cacheline of data.

As discussed above, a read request on PCI Express™ could result in several read completions. The prior approach handles one read completion at a time. In other words, when the interface receives a read completion, it waits until the PCI Express™ port is not busy to send the read completion via the PCI Express™ port to the requester. Read completions are sent via the PCI Express™ port one at a time at a fixed size, even though multiple read completions can be combined into one larger completion. The former approach is adopted because it is simple and fair between multiple requesters. However, this approach is very inefficient because the bandwidth of the PCI Express™ port is not fully utilized. An interface implementing a 64-Byte cacheline system achieves only 72% efficiency.

BRIEF DESCRIPTION OF THE DRAWINGS

Embodiments of the present invention will be understood more fully from the detailed description that follows and from the accompanying drawings, which however, should not be taken to limit the invention to the specific embodiments shown, but are for explanation and understanding only.

DETAILED DESCRIPTION

A method and an apparatus to combine read completions are described. In the following description, numerous details are set forth, such as specific configurations, data sizes, buffer capacities, etc., in order to provide a thorough understanding of embodiments of the present invention. It will be clear, however, to one of ordinary skill in the art, that these specific details may not be needed to practice every embodiment of the present invention.

Figure 1:
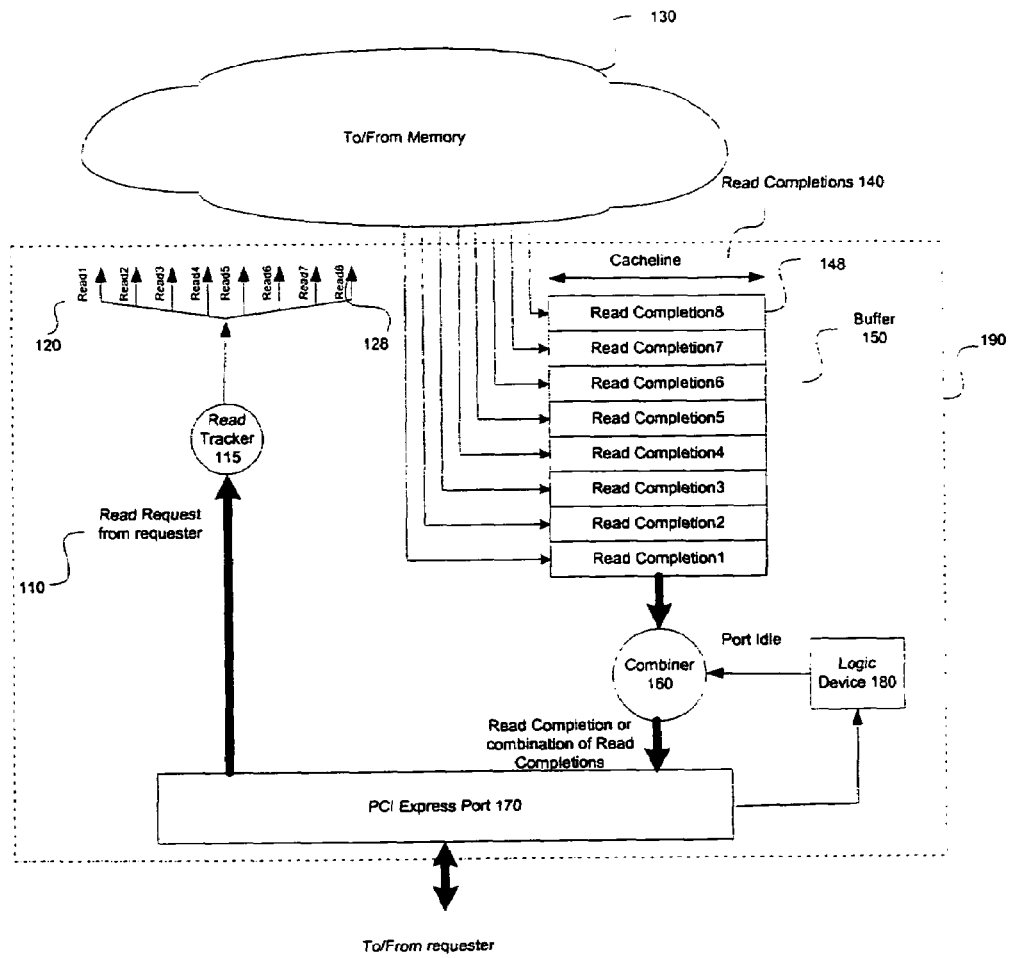
FIG. 1 shows one embodiment of an interface of a memory controller hub.

FIG. 1 shows an embodiment of an interface 190 of a device within a chipset. In one embodiment, the device is a memory controller hub. In another embodiment, the device is an I/O controller hub. The interface 190 receives a read request 110 for data from a memory 130. In one embodiment, the memory is an integral part of a processor of a computer system. In another embodiment, the memory is a distinct device from the processor. The read request 110 is sent from another component within the computer system, such as a processor, or an input/output controller hub. The device that sends the read request 110 is hereinafter referred to as the requester. The size of the data requested by the read request 110 varies from time to time. For example, the data requested can be one cacheline at one time, and four cachelines at another time. The read request 110 may or may not be broken up into a number of reads, depending on the size of the read request 110. For example, a read request for 64 Bytes is not broken up in one embodiment. In another embodiment, a read request 110 for 512 Bytes is broken up into eight reads 120 by a logic circuit, the read tracker 115. In the example in FIG. 1, the request 110 for 512 Bytes is broken up into eight reads 120, referred to as read1–read8. Each of the reads 120 is sent to the memory 130 to retrieve a cacheline of data from the memory 130. In response to each of the reads 120, the memory 130 sends a cacheline of data to the interface 190. These cachelines of data are referred to herein as read completion1–read completion8. For example, read completion8 148 is sent from the memory 130 in response to read8 128 in FIG. 1.

The interface in FIG. 1 has a serial input/output port 170. In one embodiment, the serial input/output port is a PCI Express™ port 170. Although the following discussion focuses on PCI Express™, one should appreciate that the technique disclosed is applicable to any serial input/output interconnect.

It should be noted that on PCI Express™, read completions of a given read request have to be returned in order to the requester. For example, in one embodiment including a PCI Express™ port 170, read completion8 is received before read completion1-read completion7 are received. Since the read completions have to be returned to the requester in order on PCI Express, read completion8 is temporarily held in the buffer 150 until read completion1–read completion7 are received. The eight read completions are then combined into a combination. The combination is sent to the requester via the PCI-Express port 170 in one transaction. One should appreciate that embodiments adopting other types of interconnect may not require the read completions be returned in order for a given read request.

In one embodiment, upon receipt of read completion1, the logic device 180 checks whether the PCI Express™ port 170 is idle. If the PCI Express™ port 170 is idle, read completions received is sent to the requester via the PCI Express™ port 170. If the PCI Express™ port 170 is busy, one embodiment holds read completion1 in the buffer 150 until all other read completions, i.e. read completion2–read completion8, are received and then sends to the requester a combination of the eight read completions in one transaction. This approach increases efficiency by fully utilizing the bandwidth of the PCI Express™ port 170. However, the latency of the interface 190 is increased by this approach. An alternative embodiment sends read completion1 received to the requester without waiting for all read completions are received from the memory 130 once the PCI Express™ port 170 becomes idle. This improves efficiency of the interface 190 without unnecessarily increasing the latency of the interface 190.

In one embodiment, the read completion received is stored in a buffer 150 temporarily if the PCI Express™ port 170 is busy. The capacity of the buffer 150 can be varied in different embodiments, as long as the buffer 150 can hold at least two cachelines of data. The buffer 150 can store as many cachelines as the maximum number of cachelines the PCI Express™ port 170 can send in one transaction. For example, the buffer 150 in FIG. 1 has a capacity of eight cachelines. In other embodiments, buffers of four cachelines, or sixteen cachelines, etc., can be used. One should appreciate that the description here is by way of example only, and buffers of other capacities can be used in other embodiments of the present invention.

The buffer 150 may have already stored one or more read completions in response to the request 110. If any previously received read completion is stored in the buffer 150, the last read completion received is combined with the previously received read completions. FIG. 1 shows an example of a queue of eight read completions lined up in the buffer 150. The combiner 160 combines the read completions 140 into a combination of eight cachelines of data. Once it is determined that the PCI Express™ port 170 is not busy, the combination is sent to the requester via the PCI Express™ port 170 in one transaction. Combining the read completions 140 in order to send them to the requester in a single transaction increases efficiency of the interface because the bandwidth of the PCI Express™ port 170 can be better utilized.

This embodiment increases efficiency when the PCI Express™ port 170 is busy and reduces latency the PCI Express™ port 170 is idle. This dynamic approach provides flexibility to the interface 190 to satisfy both the demand for high efficiency and the demand for low latency.

To determine whether the PCI Express™ port 170 is available, a logic device 180 within the interface 190 monitors the PCI Express™ port 170. The logic device 180 generates an output according to the status of the PCI Express™ port 170. In response to the output of the logic device 180, the interface 190 decides whether to store the read completion in the buffer 150. For example, suppose read completions is received and the logic device 180 indicates that the PCI-Express™ port 170 is idle, then read completions is sent to the requester. Otherwise, read completions is stored in the buffer 150. The description here is merely by way of example. It should be apparent that the logic device 180 can perform additional functions without going beyond the scope and boundary of the appended claims.

Figure 2:
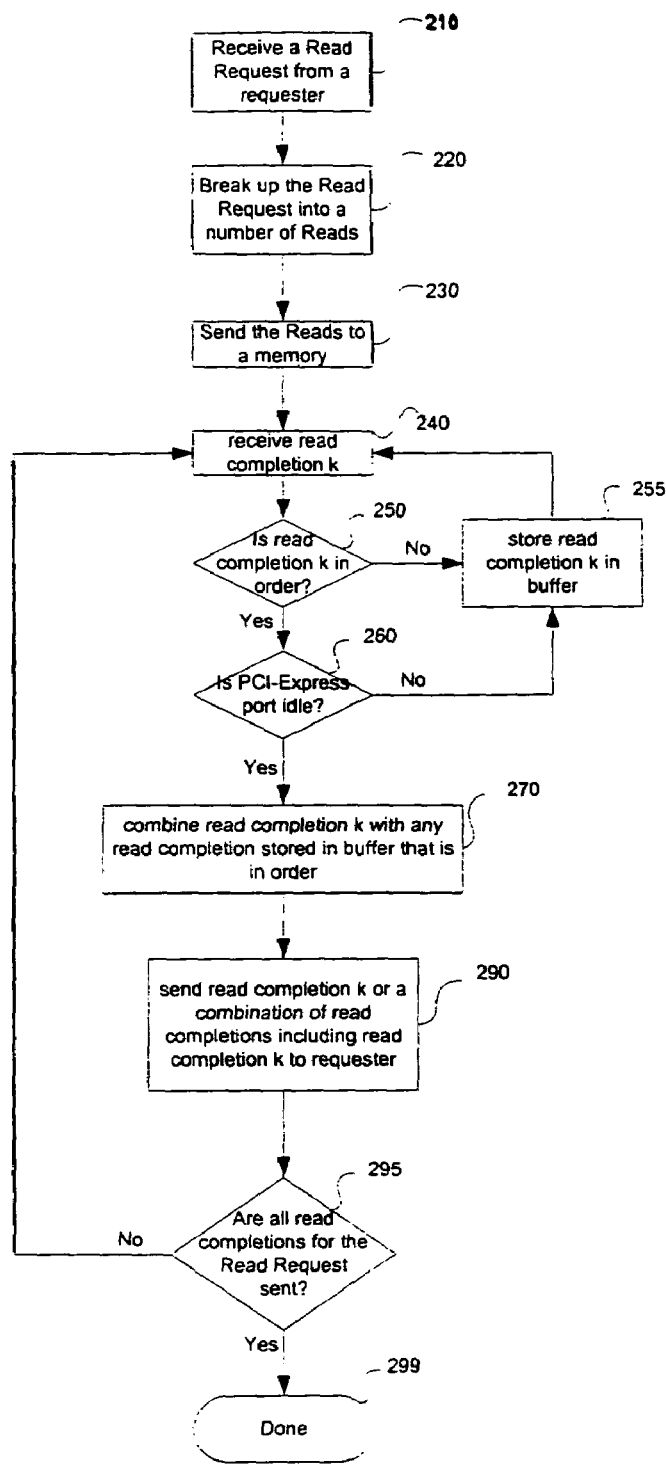
FIG. 2 shows a flow diagram describing an embodiment of handling a read request in a PCI Express™ interface of a memory controller hub.

FIG. 2 shows a flow diagram of an embodiment of handling a read request in a PCI Express™ interface of a device within a computer chipset. Although the following example focuses on PCI Express™ interface, it should be apparent that the techniques disclosed is applicable to other components within a computer system adopting other types of serial interface. In one embodiment, the device receives a read request from a requester (processing block 210). In one embodiment, the read request is broken up into several reads (processing block 220). For example, a read request for 512 Bytes is broken up into eight reads, read1–read8. The reads are sent to a memory (processing block 230). Each read retrieves a read completion of a cacheline of data. In one embodiment, read completion1–read completion8 are returned from the memory in response to read1–read8 respectively.

Upon receipt of a cacheline of data, say read completion k (processing block 240), where the index k is an integer between 1 and 8 in one example, one embodiment checks whether read completion k is in order to be sent to the requester (processing block 250). If read completion k is not in order to be sent to the requester, then read completion k is stored in a buffer (processing block 255). Otherwise, a PCI Express™ port is checked to see whether the port is idle (processing block 260). If the PCI Express™ port is busy, the data is stored in a buffer (processing block 255). If the port is idle, then read completion k is combined with any read completion stored in the buffer that is in order to be sent to the requester (processing block 270). Then read completion k or the combination of read completions including read completion k is sent via the PCI Express™ port to the requester (processing block 290). One embodiment then checks whether all read completions for the read request have been sent to requester to completely satisfy the read request (processing block 295). If the read request is not completely satisfied yet, one embodiment receives an additional read completion (processing block 240) and repeats the process. Otherwise, the read request is completely satisfied as all read completions have been sent to the requester (processing block 299).

One should note that the requirement that the read completions are sent to the requester in order may not be applicable to other types of serial interconnect. Furthermore, it should be appreciated that the opportunistic read completion combining technique is applicable to a computer system adopting any serial input/output interconnect. However, for the purpose of illustration, the following discussion focuses on a computer system adopting PCI Express™ architecture as shown in FIG. 3.

Figure 3:
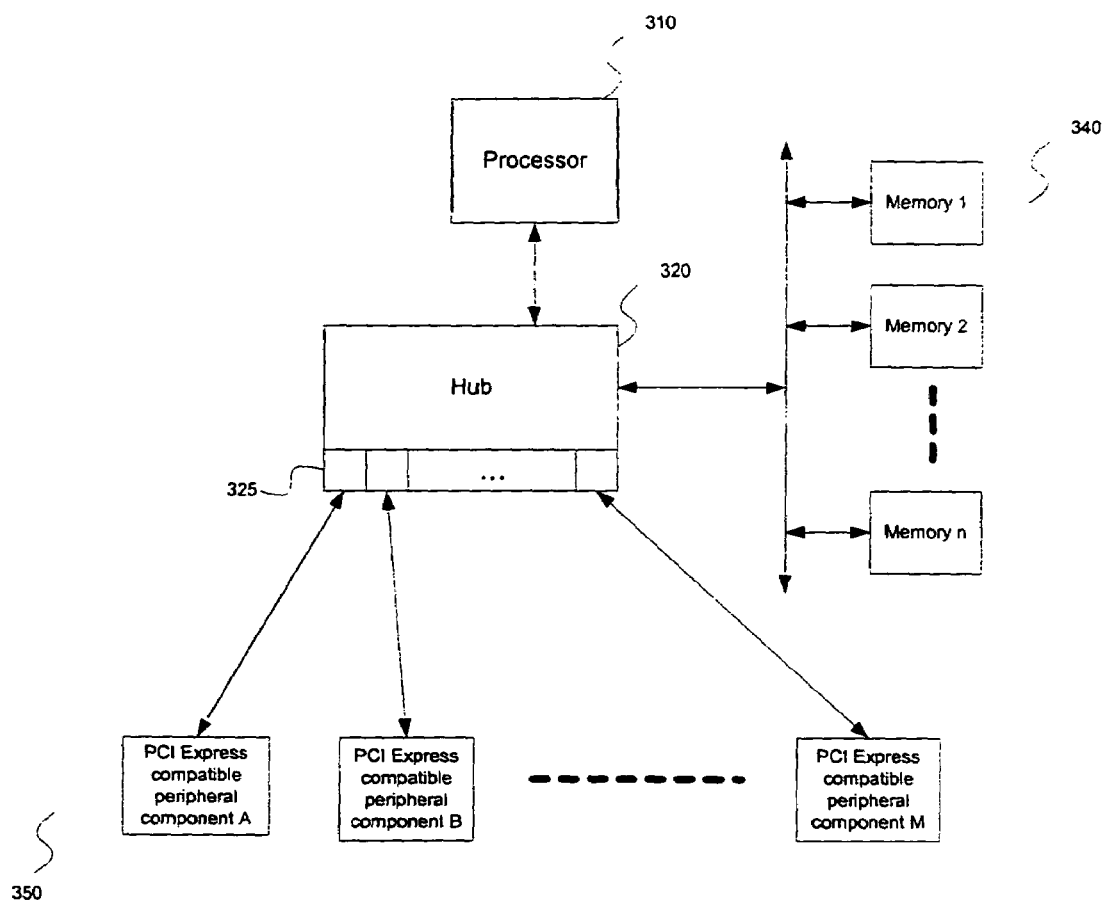
FIG. 3 shows one embodiment of a computer system.

FIG. 3 shows an exemplary computer system including a processor 310, a hub 320, a number of memory devices 340, and a number of peripheral components 350. The processor 310 is coupled to the hub 320, which is part of a computer chipset. In one embodiment, the hub is a memory controller hub. In another embodiment, the hub is an I/O controller hub. The hub 320 has a number of ports. In one embodiment, at least one of the ports is a PCI Express™ port 325. A number of memory devices 340 are coupled to the hub 320 in one embodiment. In another embodiment, the memory is an integral part of the processor 310 and there is no separate memory device in the system. A number of peripheral components 350 are coupled to the hub 320 via the ports 325. In one embodiment, the peripheral components 350 include a graphics chip. In one embodiment, one or more of the ports 325 are PCI Express™ ports. It should be noted that the number of memory devices 340 and the number of peripheral components 350 vary from one computer system to another. Moreover, the chipset may include components in addition to the hub 320. The system configuration in FIG. 3 is provided for illustrative purpose only. Other embodiments of the present invention may adopt different system configurations or different interconnect standard.

In one embodiment, the hub 320 receives requests from the peripheral components 350 or the processor 310 to retrieve data from the memories 340. The device that sends the request is hereinafter referred to as the requester. When the hub 320 receives a request, it may or may not break up the request into a number of reads depending on the size of the request. In the following discussion, suppose the request is broken up into a number of reads. The hub 320 then sends the reads to retrieve data from the memories 340. For each read, the hub 320 receives from one of the memory devices 340 a cacheline of data that satisfies partially the request. The cacheline of data received is herein referred to as a read completion.

In one embodiment, the hub 320 further includes a logic device, a buffer, and a PCI Express™ port 325. Other embodiments may include different types of serial ports. It should be noted that for PCI Express™, read completions for a given request are sent to the requester in order. However, the order requirement does not necessarily apply to other types of serial input/output ports. In one embodiment including a PCI Express™ port 325, upon receipt of read completions, a logic device within the hub 320 checks whether the PCI Express™ port 325 is idle. If the port 325 is idle, read completions is sent to the requester via the PCI Express™ port 325. However, if the port 325 is busy, read completions is stored in the buffer within the hub 320 temporarily. Buffer of various capacities, such as 2-cacheline, or 4-cacheline, etc., can be used in different embodiments of the present invention. Furthermore, if there is additional data that partially satisfies the request already stored in the buffer, the read completion just received is combined with the additional data. If additional data is received after the read completion is stored in the buffer, but before the read completion is sent to the requester, the additional data is combined with the read completion stored in the buffer. The logic device monitors the PCI Express™ port 325 to determine whether the port 325 becomes available. Once the PCI Express™ port 325 becomes available, the combined data is sent via the PCI Express™ port 325 to the requester in a single transaction.

The foregoing discussion merely describes some exemplary embodiments of the present invention. One skilled in the art will readily recognize from such discussion, the accompanying drawings, and the claims that various modifications can be made without departing from the spirit and scope of the appended claims. The description is thus to be regarded as illustrative instead of limiting.

We claim:

1. A method comprising:
    dividing up a read request into a plurality of reads;
    sending the plurality of reads to a memory device;
    receiving data that partially satisfies the read request from the memory device;
    forwarding the data if a port used to forward the data of the read request is idle;
    storing the data for combining with additional data that partially satisfies the read request as the additional data is received if the port is busy; and
    forwarding the combined data when the port is not busy.

2. The method according to claim 1, further comprising monitoring the port to determine whether the port is idle.

3. The method according to claim 1, wherein the data is received in response to one read of the plurality of reads.

4. The method according to claim 3, wherein each read of the plurality of reads retrieves a cacheline of data that partially satisfies the read request.

5. The method according to claim 4, wherein the port is a serial port capable of sending a plurality of read completions in response to a single read.

6. A method comprising:
    dividing up a read request into a plurality of reads;
    sending the plurality of reads to a memory device;
    receiving data that partially satisfies the read request from the memory device;
    storing the data for combining with additional data that partially satisfies the read request as the additional data is received; and
    forwarding the combined data via a serial port when the combined data reaches a predetermined size.

7. The method according to claim 6, wherein the data is received in response to one read of the plurality of reads.

8. The method according to claim 7, wherein each read of the plurality of reads retrieves a cacheline of data that partially satisfies the read request.

9. The method according to claim 6, wherein the serial port is a serial port capable of sending a plurality of read completions in response to a single read.

* * * * *